United States Patent [19]

Nottingham et al.

[11] Patent Number: 5,123,563

[45] Date of Patent: Jun. 23, 1992

[54] DOUBLE-WALLED COOKING UTENSIL

[75] Inventors: John R. Nottingham; John W. Spirk, both of Moreland Hills; Paul E. Brokaw, Euclid, all of Ohio

[73] Assignee: G & S Metal Products Company, Inc., Cleveland, Ohio

[21] Appl. No.: 467,502

[22] Filed: Jan. 19, 1990

[51] Int. Cl.$^5$ .............................................. A47J 27/00
[52] U.S. Cl. ................... 220/464; 220/468; 220/912
[58] Field of Search ................ 220/454, 469, 468, 83, 220/464, 68, 912, 626, 627

[56] References Cited

U.S. PATENT DOCUMENTS

| | | | |
|---|---|---|---|
| 397,847 | 2/1889 | Fredericks | 220/912 X |
| 1,662,860 | 3/1928 | Leslie | 220/469 X |
| 1,956,356 | 4/1934 | Justheim | 220/469 X |
| 2,027,296 | 1/1936 | Stuart et al. | 220/454 X |
| 2,217,555 | 10/1940 | Klusmeyer | 220/626 X |
| 3,557,774 | 1/1971 | Kreis | 220/68 |
| 3,837,330 | 9/1974 | Lanigan et al. | 220/468 X |
| 3,934,748 | 1/1976 | Racz | 220/68 X |
| 4,204,607 | 5/1980 | Zani | 220/68 |
| 4,489,852 | 12/1984 | Logan et al. | 220/469 |
| 4,541,411 | 9/1985 | Woolf | 220/464 X |

Primary Examiner—Steven M. Pollard
Attorney, Agent, or Firm—Pearne, Gordon, McCoy & Granger

[57] ABSTRACT

A double-walled cooking utensil provides inner and outer metal layers which are nested together and permanently connected along peripheral flanges. Each layer provides a planar bottom portion which cooperate with each other to define a thin chamber therebetween. A sheet of reflective aluminum is positioned in such chamber and resists the transfer of radiant heat from the bottom surface of the outer layer to the bottom surface of the inner layer which constitutes the cooking surface of the utensil. The reflective sheet is embossed with a grid of ribs which extend toward the outer layer and maintain a small spacing between the portions of the reflective layer between the ribs. The utensil promotes quality baking without requiring increased baking time, and produces bakery having more uniform texture and better color.

7 Claims, 2 Drawing Sheets

DOUBLE-WALLED COOKING UTENSIL

BACKGROUND OF THE INVENTION

This invention relates generally to cooking utensils, and more particularly to a novel and improved, double-walled baking utensil which resists burning and improves the distribution of heat along the baking surface thereof.

PRIOR ART

Double-walled cooking utensils are known. Such utensils usually provide a structure in which a chamber is defined between the walls. In double boiler-type utensils, water is usually provided in the chamber. Examples of such utensils are illustrated in U.S. Pat. Nos. 1,361,364 and 2,938,643. In other instances, the utensils are intended to insulate the cooking surface and/or distribute the heat to limit burning. Examples of such utensils are illustrated in U.S. Pat. Nos. 1,749,433; 2,151,535; and 4,489,852. It is also known to provide utensils of the type illustrated in U.S. Pat. No. 4,489,852 with a layer of polypropylene between the bottoms of two aluminum layers.

Difficulties are often encountered when baking in insulated utensils, such as the utensil of U.S. Pat. No. 4,489,852. For example, when baking cookies, more time is required to complete the baking cycle. Also, the lower inner portions of the cookies tend to remain doughy and are not completely done. Further, the cookies tend to be small and pale in appearance.

SUMMARY OF THE INVENTION

There are a number of aspects to the present invention. In accordance with one important aspect, a novel and improved double-walled baking utensil is provided with a sheet of reflective material between the two utensil layers. Such sheet reflects radiant heat and thereby resists radiant heat transfer from the bottom layer to the cooking surface. In the illustrated embodiment, the reflective sheet is lightly embossed over substantial areas so that the reflected radiant heat from the cooking surface is diffused to distribute the heat, and thereby ensure that the cooking surface is uniformly heated. Further, in the preferred embodiment, the reflective material is aluminum, which is highly conductive and tends to distribute the heat uniformly over the cooking surface. Still further, the preferred reflective material is spaced a small distance from the bottom wall to promote the insulating function and to improve the reflective action. The illustrated reflective material is provided with zones of relatively deep embossments to ensure the spaced relationship.

In the preferred embodiment, the exterior surfaces of both layers are provided with a non-stick coating such as "SilverStone". ("SilverStone" is a trademark of Du Pont.) With such coating, the utensil is easier to clean. In addition, the comparative tests with and without such coating indicate that cookies have better and deeper color when baked on utensils having such coating. It is believed that this improved baking performance is due, at least in part, to the fact that such coatings tend to be reflective in character.

Further, in accordance with the present invention, an improved structure is provided with reduced manufacturing costs. The two layers are formed of identical size along the bottom and sides thereof. Therefore, a single die can be used to produce both the top layer and the bottom layer. The two layers are then nested together and a flange extending around the upper layer periphery is rolled over a flange of reduced width on the lower layer member to provide a permanent and tight connection between the two. Because the inner layer member has the same dimensions as the outer layer member prior to assembly, the bottom portion of the inner layer is subjected to compressive stresses when assembled inside the outer layer. Further, the outer layer bottom portion is simultaneously subjected to tensile stresses. With such structure, a small spacing is provided between the two layers along the bottom portions thereof inwardly spaced from the periphery of the bottom wall portion. Such spacing results in a chamber in which the reflective surface is located.

Tests have established that insulated double layer baking utensils in accordance with the present invention, when compared to insulated utensils as illustrated in U.S. Pat. No. 4,489,852, provide more uniform baking, complete the baking cycle in less time, produce larger cookies, and result in baked goods of better color.

These and other aspects of this invention are illustrated in the accompanying drawings and are more fully described in the following specification.

DETAILED DESCRIPTION OF THE DRAWINGS

Figure 1:
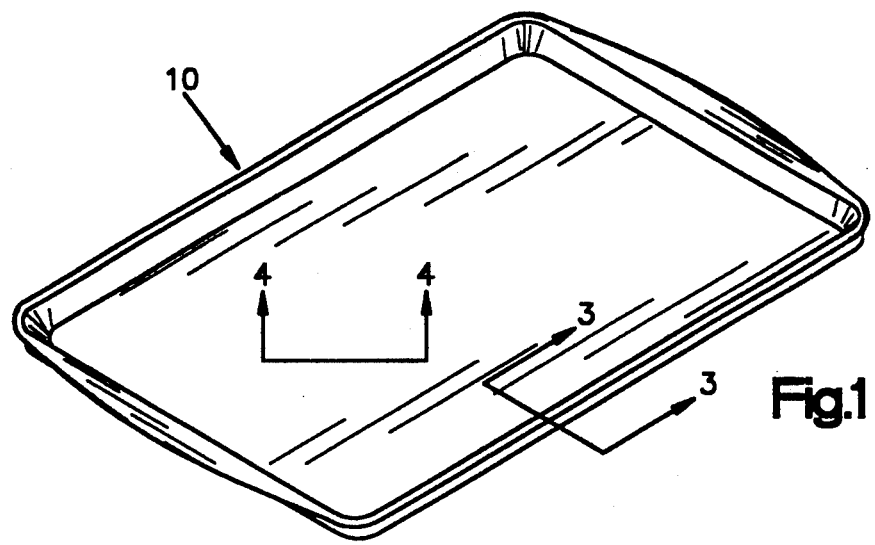
FIG. 1 is a perspective view illustrating a cookie sheet type baking utensil in accordance with the present invention.
Figure 2:
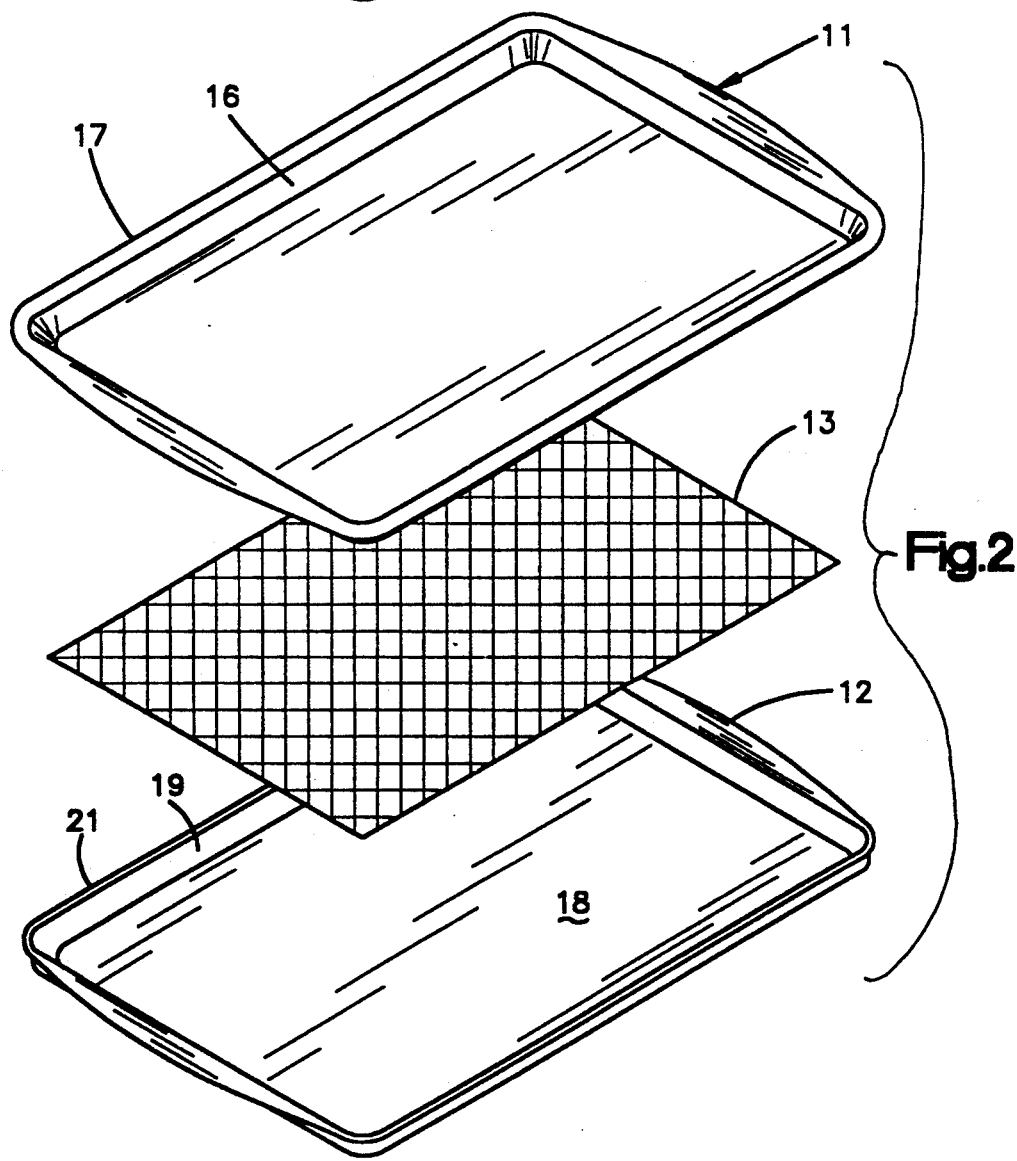
FIG. 2 is an exploded view of the three component parts of the utensil of FIG. 1 prior to assembly.

FIG. 1 is a perspective view of a cooking utensil 10, commonly referred to as a "cookie sheet," incorporating the present invention. The preferred embodiment of the utensil 10 includes three components separately illustrated in the exploded, perspective view of FIG. 2. The three components are an inner pan or layer 11, an outer pan or layer 12, and a sheet of reflective material 13. In the drawings, the thickness of the components is exaggerated to better illustrate the structure.

The inner layer or pan provides a flat central wall 14, a laterally extending peripheral wall 16 extending from the periphery of the center wall 14, and a flange 17 which extends around the periphery of the wall 16.

The outer layer or pan 12 is also provided with a flat center wall 18, a laterally extending peripheral wall 19, and a peripheral flange 21. Preferably, the inner and outer layers of the pans 11 and 12 are die-formed within the same die so that they have identical inner walls 14 and 18 and identical peripheral walls 16 and 19. However, as described in greater detail below, the peripheral flange 17 of the inner pan is wider than the peripheral flange 21 of the outer pan to permit the permanent assembly of the two by rolling the outer extremity of the flange 17 around the peripheral flange 21, as described below.

The reflective sheet 13 has a size substantially the same as the size of the two center walls and, when the components are nested together, extends between the two center walls 14 and 18, as discussed below.

Figure 4:
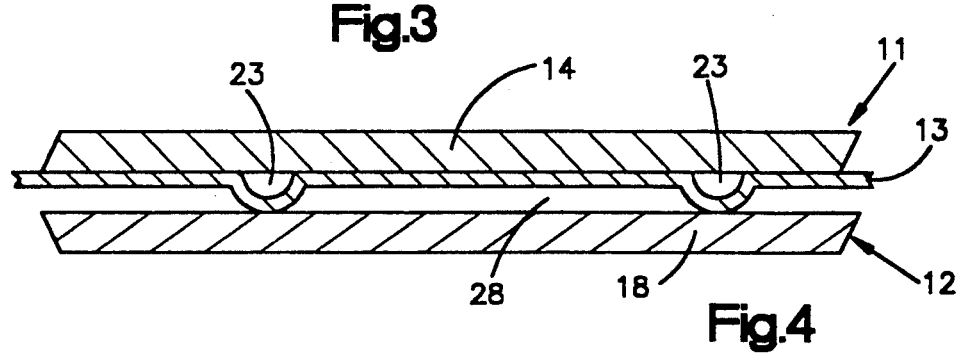
FIG. 4 is an enlarged, fragmentary section taken along line 4—4 of FIG. 1, illustrating the relationship of the two utensil layers and the reflective sheet located between the layers.
Figure 5:
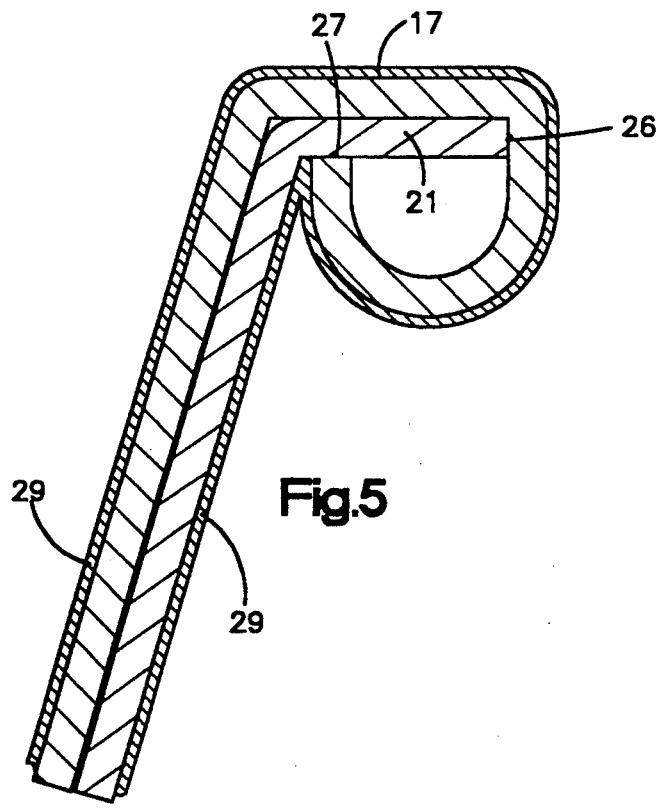
FIG. 5 is an enlarged fragmentary view of the surface of the reflective sheet material.

In the illustrated embodiment, the reflective sheet 13 is formed of aluminum foil which is embossed, as best illustrated in FIGS. 4 and 5, in a grid of diagonally arranged squares 22. The surfaces of the squares 22 are lightly embossed to provide a lightly textured surface, and the squares are separated from each other by relatively deep, embossed ribs 23 arranged in two arrays extending perpendicular to each other. In the illustrated embodiment, the ribs 23 extend diagonally with respect to the reflective sheet 13.

Figure 3:
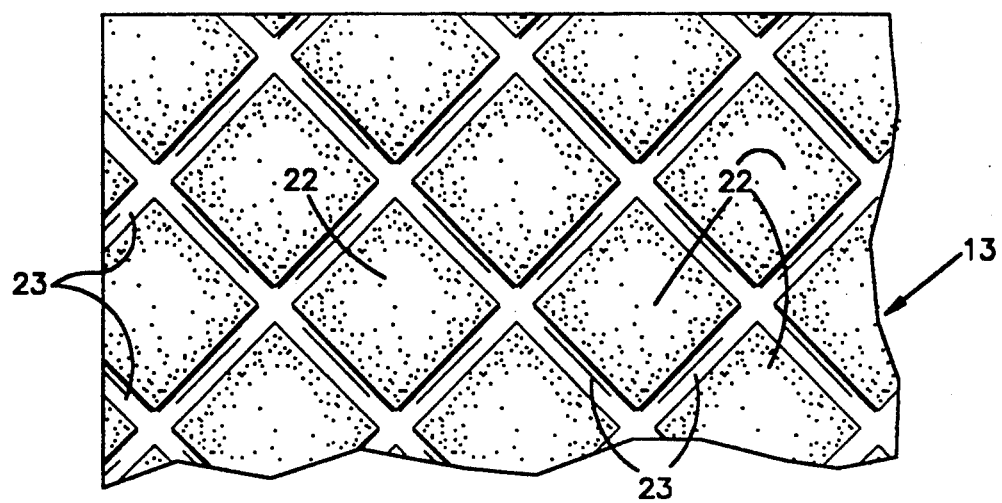
FIG. 3 is an enlarged, fragmentary section taken along line 3—3 of FIG. 1, illustrating the connection between the two layers.

To assemble the utensil 10, the inner and outer layers 11 and 12 are nested together with the reflective sheet 13 positioned between the two flat center walls 14 and 18. Because the center walls 14 and 18 are identical and the peripheral walls 16 and 19 are identical, the interengagement between the peripheral walls 16 and 19 adjacent to the respective adjacent center walls 14 and 18 fits with an interference fit which tends to place the center wall 14 in compression and the center wall 18 in tension. After the three components are nested together, the outer portion of the flange 17 is rolled around the outer edge 26 of the flange 21, as best illustrated in FIG. 3. The rolling on the outer portion of the flange 17 is continued until the edge 27 of the flange 17 tightly engages the underside of the flange 21 to press the two flanges into intimate contact. The engagement between the edges 26 and 27 and the adjacent flange portion provides an additional seal structure. This structure resists penetration of moisture, etc. into the zone between the pans. However, even if small amounts of moisture do penetrate, it is boiled out when the pan is used.

Because the two center wall portions 14 and 18 are stressed in opposite manners, there is a tendency for the inner wall portion 14 to bow up to some extent as it extends away from the associated peripheries, with the result that the two layers define a thin chamber 28 therebetween. The reflective sheet 13 is positioned in such chamber 28.

The reflective sheet in the illustrated embodiment is aluminum and is positioned in the chamber 28 so that the ribs 23 project in a downward direction toward the wall 18 to maintain a spacing between the lightly embossed squares 22 and the surface of the layer 18, as best illustrated in FIG. 4. By ensuring that such spacing occurs, the reflective character of the sheet is more effective in reflecting back radiant heat emanating from the layer 18 to prevent excessive heat transfer from the lower or outer layer 18 and the upper or inner layer 14 which constitutes the cooking surface of the utensil. Similarly, the radiant heat radiating downwardly from the upper layer 14 tends to be reflected back by the reflective sheet but, because of the light texturing of the squares 22, is diffused or spread so as to provide a more uniform temperature in the center wall 14. Preferably, the reflective sheet is formed of a highly conductive material, such as aluminum, so that it tends to more evenly distribute the heat reaching the wall 14, and thereby improves the uniformity of the temperature of the inner wall 14.

It has been found by actual tests, that the time required to bake cookies of similar size and content in a baking sheet illustrated and incorporating the present invention is reduced compared to the time for comparable baking in a utensil in accordance with U.S. Pat. No. 4,489,852. It has also been established that the baking of the cookies is more uniform with the present invention than with such prior art double-layered utensil. The lower interior portions of a cookie tend to be undercooked with such prior art double-layered utensil. On the other hand, a more uniform, full baking is achieved with the present invention, even though the baking time is less. Still further, it has been established that improved color and size are achieved with the present invention.

Preferably, the exterior surfaces of the two layers or pans 11 and 12 are provided with a non-stick coating 29, such as the coating marketed under the E. I. Du Pont de Nemours trademark "SilverStone." Since both the upper and lower surfaces of the utensil are provided with such coating, the utensil is easily cleaned after use. Further, it has been found that the color and texture of cookies baked on a utensil incorporating the present invention having such a non-stick coating tends to be improved when compared to cookies baked on utensils differing only in that they do not provide the SilverStone coating. It is believed that this improved baking performance achieved with utensils in accordance with this invention having a SilverStone coating thereon may result from the reflective character of the coating, which tends to minimize localized hot spots and provide a more uniform baking action.

The comparative tests discussed above were conducted with a cookie sheet in which the inner and outer members 11 and 12 were formed of steel having a thickness of 0.010 inch. The reflective sheet 13 was embossed aluminum foil having a thickness of 0.0015 inch, with ribs 23 about 0.005 inch deep. Further, except for the test to determine the effect of the non-stick coating, the test utensils were provided with a "SilverStone" coating on all exterior surfaces.

Because the two layers are identical in size except along the flanges, both layers can be formed in the same die to ensure exact duplication of dimension. Further, the use of a single die set to produce both the inner and outer layers reduces manufacturing costs.

Although the preferred embodiment of this invention has been shown and described as a cookie sheet, it should be understood that other types of utensils can be produced in accordance with this invention, and that various modifications and rearrangements of the parts may be resorted to without departing from the scope of the invention as disclosed and claimed herein.

What is claimed is:

1. An insulated cooking utensil comprising inner and outer sheet metal members nested together and cooperating to define said utensil, the outer surface of said outer member defining the outer surface of said utensil and the inner surface of said inner member defining the inner and cooking surface of said utensil, said inner and outer members each providing a flat bottom wall and a peripheral laterally extending side wall extending from the periphery of said bottom wall, said bottom and side walls of said members having the same size before they are nested together, said bottom walls cooperating to define a chamber therebetween resisting the transfer of heat from said bottom wall of said outer member to said bottom wall of said inner member, engagement of said peripheries of said bottom walls applying compressive stresses to said bottom wall of said inner member and tensile stresses to said bottom wall of said outer member, said stresses causing said bottom walls to be spaced apart along portions thereof within said peripheries thereof.

2. An insulated utensil as set forth in claim 1, wherein a separate piece of radiant heat-reflective material is positioned in said chamber having a thickness less than the width of said chamber, whereby said radiant heat-reflective material is spaced from the adjacent of said bottom walls along at least a substantial portion of the surface thereof, said radiant heat-reflective material resisting transfer of radiant heat between said bottom walls.

3. An insulated utensil as set forth in claim 1, wherein said side walls of said inner and outer members are joined along the edges thereof remote from said bottom walls and said outer surface of said outer member and said inner surface of said inner member are provided with a non-stick coating promoting easy cleaning of all exposed surfaces of said utensil.

4. An insulated utensil as set forth in claim 3, wherein said non-stick surface is "SilverStone" and renders said exposed surface reflective to radiant heat.

5. An insulated baking utensil comprising upper and lower sheet metal members joined together along the periphery thereof, said members each providing a substantially flat wall portion which cooperate to define a chamber therebetween, and an aluminum reflective sheet in said chamber having a thickness less than the width of said chamber, said reflective sheet being spaced from at least portions of said flat wall portions, said reflective sheet operating to reflect radiant heat to resist transfer of heat between said wall portions and to uniformly distribute heat along said wall portion of said upper member.

6. An insulated utensil as set forth in claim 5 wherein said reflective sheet is embossed aluminum foil and embossment operates to produce spaces between said reflective sheet and said wall portion of said bottom member.

7. An insulated utensil as set forth in claim 6, wherein a non-stick "SilverStone" coating covers the external surfaces of said metal members.

* * * * *

UNITED STATES PATENT AND TRADEMARK OFFICE
CERTIFICATE OF CORRECTION

PATENT NO. : 5,123,563
DATED : June 23, 1992
INVENTOR(S) : Nottingham et al.

It is certified that error appears in the above-indentified patent and that said Letters Patent is hereby corrected as shown below:

In the Drawings:
At page 2 of 2 of the drawings, FIG. 3 should be relabeled FIG. 5, and FIG. 5 should be relabeled FIG. 3.

Column 4, lines 66 and 67 (Claim 1, lines 14 and 15), delete "said peripheries of said bottom" and insert --the side--.

Signed and Sealed this

Twenty-second Day of August, 1995

Attest:

BRUCE LEHMAN

*Attesting Officer*     *Commissioner of Patents and Trademarks*